Nov. 19, 1935. M. H. TUTTLE Re. 19,763

PROCESS FOR SEPARATION OF MINERAL OIL

Original Filed Dec. 22, 1932

INVENTOR
Malcolm H. Tuttle
BY
Austin & Dix.
ATTORNEYS

Reissued Nov. 19, 1935

Re. 19,763

UNITED STATES PATENT OFFICE 19,763

PROCESS FOR SEPARATION OF MINERAL OIL

Malcolm H. Tuttle, New Rochelle, N. Y., assignor to Max B. Miller & Co. Inc., New York, N. Y., a corporation of Delaware Original No. 1,912,349, dated May 30, 1933, Serial No. 648,383, December 22, 1932. Application for reissue July 3, 1934, Serial No. 733,620

24 Claims. (Cl. 196—13)

Figure 1:
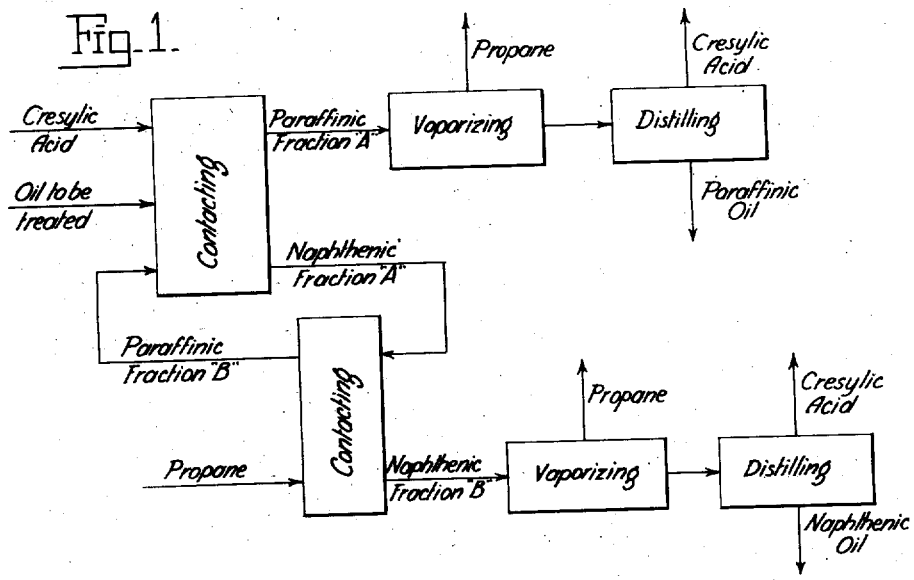

This invention relates to a process for the separation of mineral oil into fractions which are respectively more paraffinic in composition and characteristics and more naphthenic in composition and characteristics than is the original oil and which may have similar boiling ranges.

Mineral oils comprise naphthenic constituents and paraffinic constituents which have different characteristics that are known to a considerable extent; and these constituents impress their characteristics upon the oil to a degree depending upon the proportion in which they are present in the oil. Oils comprising a relatively higher proportion of paraffinic constituents are commonly called paraffinic base oils, an example thereof being oils from the Appalachian field; and oils containing a relatively lower proportion of paraffinic constituents and therefore a relatively higher proportion of naphthenic constituents are commonly called naphthenic or asphaltic base oils, an example of such oils being obtained from gulf coastal or Mexican fields; and oils containing an intermediate proportion of paraffinic constituents and also containing naphthenic constituents are commonly called mixed base oils, an example of such oils being oils from the mid-continent fields. Paraffinic oils having a given viscosity have lower specific gravity, a higher flash test, a smaller change of viscosity with changes in temperature and a higher ratio of hydrogen to carbon than do naphthenic oils of the same viscosity. Paraffinic oils are more stable and more desirable as lubricants, particularly under conditions involving high temperatures and extensive changes of temperature, than are oils in which paraffinic constituents are present in relatively lower proportion and naphthenic constituents are present in relatively high proportion. The characteristics of mid-continent or mixed base oils are intermediate the characteristics of paraffin base and asphalt base oils.

Naphthenic oils are preferable to paraffinic oils for some uses, such as insulating oils for electrical apparatus and lubrication of chains and of gearing not subjected to low temperatures.

An object of this invention is to provide a process whereby mineral oils may be rapidly and economically separated into fractions which are respectively more paraffinic and more naphthenic in composition and in characteristics than is the original oil, the separation being effected regardless of whether the oil has previously been subjected to acid treatment or dewaxing treatment or both, and without chemical reaction and without formation of sludge, to the end that solvents employed to effect such separation may be used indefinitely and losses minimized.

A specific object of this invention is to provide a method whereby oils obtained from mixed base petroleum may be separated into fractions of which at least one is a lubricating oil stock having viscosity-gravity characteristics and viscosity-temperature characteristics similar to or equal to or better than such characteristics of oil stocks having similar viscosity and obtained by usual distillation from crude oils from the Pennsylvania field, a further object being the production from decidedly naphthenic or asphaltic oil of an oil fraction of which the characteristics are at least substantially more paraffinic than the characteristics of the original oil.

To assist in understanding the effects and results of the practice of this invention, reference may be made to certain values commonly employed to indicate the character of oil. Thus the relation of viscosity to specific gravity is indicated by the viscosity-gravity constant determined in accordance with the following equation:

$$a=\frac{G-0.24-0.22\log(V'-35.5)}{0.775}$$

where $a$=viscosity-gravity constant $V'$=Saybolt viscosity at 210° F.
$G$=specific gravity at 60° F.

Pennsylvania lubricating oils have a viscosity-gravity constant falling between approximately .807 and .827; mixed base mid-continent lubricating oils have a viscosity-gravity constant falling between approximately .827 and .867; and naphthenic or asphalt base lubricating oils from the gulf coast and California have a viscosity-gravity constant falling between approximately .867 and .887. However, specific oils from one field will have a viscosity-gravity constant falling within the range above given for another field. Moreover, the relation of temperature to viscosity is measured by a viscosity index in which Pennsylvania oils have a value of 90 to 100 and oils of lower viscosity index are less paraffinic and the oils of higher viscosity index are more paraffinic.

It has heretofore been proposed to treat oil with sulphuric acid for the removal of asphalt and unstable unsaturated hydrocarbons, but such treatment involves chemical reaction and production of sludge from which the recovery of asphalt is difficult and uneconomical, and loss of paraffinic constituents carried down with the sludge; and the treated oil retains marked naphthenic characteristics.

It has been proposed heretofore to divide mineral oil containing naphthenic and paraffinic fractions into fractions more paraffinic and more naphthenic than the original oil by extracting the oil with nitro-aromatic solvents, which may be termed naphthenic solvents in that they have greater solvent power for naphthenic constituents than for paraffinic constituents, the mixture separating by gravity into an upper layer comprising the more paraffinic fraction and some of the solvent and a lower layer comprising the more naphthenic fraction dissolved in a major proportion of the solvent. Such treatment of mixed base oils having a high or intermediate asphalt content, and particularly such treatment of the residue of such oils, by the use of selective solvents heretofore proposed has proven impracticable or has failed. The apparent cause is that the solvents proposed when used in proportions determined by economical considerations appear to be miscible with residual oils of high or intermediate content of naphthenic constituents or asphalt, with the result that the necessary separation into layers does not occur. It appears that the nitro-aromatic solvents form with the asphalt or with the liquid naphthenic constituents, or with both, a mixture having extensive solvent power for paraffinic constituents. Cresylic acid has selective solubility for naphthenic constituents, but when used in sufficient proportion to take a substantial proportion of naphthenic constituents into solution, in an effort to divide oil into naphthenic and paraffinic fractions by extraction, it has a substantial solvent power for paraffinic constituents.

I have found that mineral oil containing paraffinic and naphthenic constituents can be separated into fractions respectively more paraffinic and more naphthenic than the original oil by subjecting the oil to contact with cryslyic acid in the presence of a solvent which has greater solvent power for paraffinic constituents than for naphthenic constituents, the treatment preferably being applied under such conditions that the solvents employed are mutually miscible to only a limited extent. It appears that under such conditions, the normal selectivity of cresylic acid for naphthenic constituents is increased or its solvent power for paraffinic constituents is decreased, particularly when the solvent of paraffinic constituents has limited solubility for and in the cresylic acid; and it appears also that the selectivity of the solvent for paraffinic constituents is increased or its solvent power for naphthenic constituents is decreased in the presence of cresylic acid. When the oil is contacted with cresylic acid in the presence of such a paraffinic solvent, separation occurs promptly and readily.

In accordance with this invention, therefore, mineral oils are separated into fractions respectively more paraffinic and more naphthenic than the original oil by extracting the oil with cresylic acid in an operation in which at least some part of the contacting of the oil with cresylic acid occurs in the presence of a solvent having greater solvent power for paraffinic constituents than for naphthenic constituents. In the presence of such solvent, the tendency of the cresylic acid, when present in sufficient proportion to effect substantial extraction or solution of the naphthenic constituents, to take into solution a substantial proportion of the paraffinic constituents, is minimized; and there is produced from a mixed base or naphthenic oil a fraction having characteristics similar to or equal to or better than the characteristics of a similar fraction obtained from paraffin base oil, or there is produced a fraction having characteristics at least markedly more paraffinic than the original oil. Thus, the extraction of the oil with cresylic acid in the presence of a paraffinic solvent produces results heretofore unobtainable by the use of cresylic acid alone.

Commercial cresylic acid comprises orthocresol, metacresol, paracresol, phenol and xylenol and a reference herein to cresylic acid is intended as a reference to such acid or to those components thereof or to mixtures of any two or more of those components. Such substances can readily be removed from the oil by distillation at temperatures which do not tend to decompose the oil or the substances.

By way of explanation, cresylic acid, unless "chemically pure" is specified, is commonly understood in the art to consist principally of cresol (ortho, meta and/or para), with some phenol and other substances normally occurring in the mixture; the percentages of phenol and such other substances vary but are ordinarily comparatively small; for instance, the phenol may constitute a few percent of the total cresylic acid, while other substances may be present only as impurities.

Paraffinic solvents suitable for use in the practice of this invention include ethane, propane, butane, pentane, natural gasoline and light naphtha, such light nephtha preferably being preliminarily treated with a solvent, such as cresylic acid, having a selective solvent power for naphthenic constituents of oil. Such paraffinic solvents have a limited solubility in and for cresylic acid and a greater solvent power for paraffinic constituents of oil than for cresylic acid and they may be removed from the cresylic acid and from the oil for re-use by distillation which does not involve the use of temperatures that would decompose the oil or the cresylic acid.

In the practice of this invention, the oil to be divided into fractions is, at least at one point in the treatment thereof, contacted simultaneously with cresylic acid and a paraffinic solvent and such contacting may be effected in a batch operation, or in a continuous operation in which there is preferably maintained a counter-flow of solvents while the oil is introduced to such counter-flow at an intermediate point thereof and the naphthenic fraction is taken off at a point on the same side of the point of introduction of the oil as the point of introduction of the paraffinic solvent and the naphthenic fraction is taken off at a point on the opposite side of the point of introduction of the oil.

The solution of naphthenic constituents is heavier than the solution of paraffinic constituents and in the separating operation the solution of paraffinic constituents forms ultimately an upper layer and the solution of naphthenic constituents forms ultimately a lower layer. In continuous extraction, the separation occurs in the counter-flow system. The solution of the paraffinic fraction will comprise paraffinic constituents and naphthenic constituents in a ratio substantially greater than the ratio of paraffinic constituents to naphthenic constituents in the original oil and it will contain the major portion of the paraffinic solvent and some of the naphthenic solvent. The solution of naphthenic constituents will include naphthenic constituents and paraffinic constituents in a ratio greater than the ratio of naphthenic constituents to paraffinic constituents in the original oil and will contain the major portion of the naphthenic solvent and some of the paraffinic solvent. The separation of paraffinic constituents from naphthenic constituents cannot be made complete in a commercial operation, but the extracting treatment produces fractions respectively richer in paraffinic constituents and naphthenic constituents than is the original oil.

While the oil and solvents are in contact and prior to the separation into layers above mentioned, the desired dissolving of the constituents of the oil in the solvent or solvents may be effected by heat or agitation or both. Prior to the separation it is preferable that the temperature should be sufficiently high to promote the solvent action of the solvents upon the constituents of the oil, but during the separation it is desirable that the temperature should be such as will promote such separation. Low temperatures promote separation, but the temperature should not be so low as to effect solidification of any of the solvents. Moreover, in the treatment of wax-containing oil the mixture of solvent and oil should at some time before separation possess a temperature at which the wax is all in liquid state, but the separation may be made thereafter at a temperature at which a part of the wax is solidified. The presence of the paraffinic solvent permits the wax present to precipitate in particles separate from each other and from the oil, giving a mixture which is fluid and in which the oil is free and ready to be acted upon. Thus the oil may be mixed at a temperature above the melting point of the oil, with a portion of either of the solvents that has not been cooled or has been warmed; and after the mixture is cooled it may be introduced to the action of counter-flowing solvents which are at a temperature which promotes separation.

In the practice of this invention, the lighter is the paraffinic solvent, the greater is the specific gravity difference between the solution of paraffinic fraction and the solution of naphthenic fraction, and the greater is the tendency for separation of the solutions to occur; and the extraction operations will be conducted under such conditions of temperature and pressure, consistent with the foregoing, that the solvents employed are in liquid phase.

In the practice of this invention, a batch extraction step or a continuous extraction step may be repeated as often as may be necessary to impart to the resulting products the paraffinic and naphthenic characteristics respectively desired for those fractions, or a continuous extraction step may be extended for a similar reason.

Thus, a feature of this invention is that the oil to be treated, which may be a distillate or a residue and may or may not have previously been refined or dewaxed, may be subjected simultaneously to contact with cresylic acid and a paraffinic solvent.

A further feature of this invention is that cresylic acid alone may be caused to be capable of effecting division in fractions respectively more paraffinic and more naphthenic an oil which would not otherwise separate into two layers when treated with cresylic acid alone. In accordance with this feature of this invention the oil is first contacted with cresylic acid alone. The solution of oil constituents in cresylic acid is then extracted with a paraffinic solvent as above set forth, the oil constituents thus being simultaneously contacted with both paraffinic and naphthenic solvents. The paraffinic solvent and oil constituents in solution therein is then separated from the naphthenic solvent which contains naphthenic constituents in solution, and freed of paraffinic solvent. The paraffinic constituents so obtained, and such naphthenic solvent and constituents as are contained therein, are then introduced to the oil flowing to contact with the cresylic acid. The paraffinic oil constituents so added to the oil to be treated render that oil mixture capable of being divided by cresylic acid alone into a paraffinic fraction and a solution of oil constituents in cresylic acid, which fraction and solution separate readily into two layers. The upper layer of this separation is freed of cresylic acid and constitutes the desired paraffinic fraction. Apparently the increasing of the concentration of paraffinic constituents in the original oil renders it separable by use of cresylic acid alone when it would not otherwise be separable by that solvent alone.

The naphthenic and paraffinic solvents may be used in widely varying proportions, the proportions found effective in practice being one to three parts by weight of naphthenic solvent and one to three parts by weight of paraffinic solvent to each part of oil to be treated. In view of the wide variations in the properties of oils from different sources, the most economical proportions which produce fraction of desired character should be determined by test of the oil to be treated.

Moreover, it is contemplated that in the practice of this invention the effectiveness of cresylic acid or components thereof as naphthenic solvents may be increased by mixing therewith a suitable proportion of solvents which have a selective solvent power and definite selectivity for naphthenic constituents and a limited solvent power for mineral oil constituents, and dissolve preferentially asphalts and those constituents of the oil which are of higher molecular weight. Examples of such solvents are sulphur dioxide, furfural, pyridine, and aniline, and inasmuch as they preferentially dissolve asphalts and constituents of higher molecular weight but have a limited solvent power for mineral oil, they do not have that tendency to be miscible in all proportions with mixed base oil of high asphalt content, which tendency is possessed by dinitro-aromatic solvents.

Figure 2:
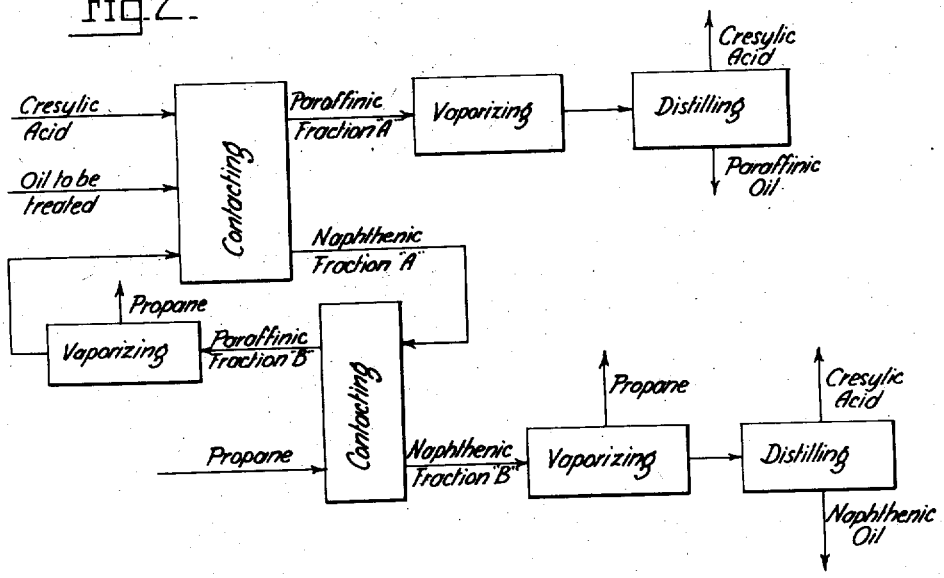

In the drawing:

Fig. 1 is a flow sheet indicating the steps in the direct treatment of oil in accordance with this invention; and Fig. 2 is a flow sheet indicating the steps in the modified procedure above mentioned.

While the invention may be carried out by the treatment of separate batches of oil, there are indicated in Fig. 1 the steps whereby continuous treatment of mixed base oils may be effected. The oil to be treated which may be either a distillate or a residue, is contacted with cresylic acid or with one or more of its components at a temperature which causes the mixture to separate into layers. In the procedure illustrated, the untreated oil is continuously introduced into a contacting chamber operation preferably at an intermediate level and cresylic acid or one or more of its components is introduced into that chamber at a suitable rate at an upper level thereof and from a similar level there is withdrawn naphthenic fraction A which is passed into a second contacting operation, preferably at an upper level thereof, into which propane is introduced at a suitable rate, preferably at a lower level thereof, while there is withdrawn therefrom naphthenic fraction B and paraffinic fraction B which is continuously returned to the first contacting operation, preferably at a lower level thereof. Paraffinic fraction A is treated for the removal of propane as by the reduction of the pressure upon the fraction or by the application of heat or by both of such steps. The propane is passed to propane storage while the residue of paraffinic fraction A is subjected to heat to effect distillation therefrom of the cresylic acid which is passed to cresylic acid storage. The residue of the paraffinic fraction A constitutes the desired paraffinic oil. The contacting step to which is introduced naphthenic fraction A and propane, is so conducted as to effect counter-flow with the result that the propane removes paraffinic constituents from naphthenic fraction A and carries them back to the main contacting operation, thus providing in the main contacting operation a counter-flow of paraffinic and naphthenic solvents, to a mid-point of which the oil is introduced. Naphthenic fraction B is treated for the vaporization of propane as by reduction of pressure or application of heat or both of such steps, and the propane is passed to propane storage while the residual mixture is subjected to distillation for the removal of cresylic acid, the residue of naphthenic fraction B constituting the desired naphthenic oil. Contacting chambers employed are preferably packed to promote agitation and contacting and they may be separate as indicated in the drawing or joined together.

Referring to Fig. 2 of the drawing, the oil to be treated is first contacted with cresylic acid; and the cresylic acid containing oil constituents in solution is then passed into contact with propane or other paraffinic solvent which effects a washing of the heavy fraction of the first contacting step. The resulting solution of paraffinic constituents and of small quantities of naphthenic constituents and cresylic acid in the paraffinic solvent separates readily from the solution of naphthenic constituents in cresylic acid. After separation it is treated for the removal of paraffinic solvent and then added to the oil flowing to the original contacting step for immediate contact with cresylic acid alone. The treatment with cresylic acid then leaves a substantial paraffinic fraction undissolved and that paraffinic fraction forms an upper layer and is removed and is freed from cresylic acid and constitutes the desired paraffinic oil. The naphthenic fraction, after treatment with the paraffinic solvent and removal of the paraffinic solution, as above stated, is treated for removal of solvents and constitutes the desired naphthenic fraction.

The pressures and temperatures necessary in order that solvents which are in vapor phase at normal temperature may be maintained in liquid phase during use may be determined by reference to existing pressure and temperature tables.

In the practice of this invention, the paraffinic fraction produced is more paraffinic than the original oil and the naphthenic fraction produced is more naphthenic than the original oil, and those two fractions are respectively more paraffinic and more naphthenic than any fractions obtained by the use of cresylic acid alone.

The paraffinic fraction may be subjected to any desired treatments such as acid treatment, clay treatment and dewaxing for the purpose of providing finished lubricants, it being desirable in some cases to treat the paraffinic oil with a caustic soda solution, e. g. 5%, for the removal of traces of cresylic acid before such further treatment. Herein the expression naphthenic constituents includes asphalts and mixtures of asphalts and naphthenic oils.

As a specific example of procedure in accordance with this invention, a residue obtained from mid-continent petroleum and having an A. P. I. gravity of 21.7, a Saybolt Universal viscosity of 148 seconds at 210° F. and a viscosity-gravity constant of 0.845, was treated in continuous counter-flow contacting chambers at a temperature of 24° F. using two pounds of commercial cresylic acid and two pounds of propane per pound of original oil, and the resulting products had, after removal of the solvent, the following characteristics:

| | Untreated oil | Paraffin oil | Naphthenic oil |
|---|---|---|---|
| Specific gravity $\frac{60°}{60°}$ F | .9236 | .8888 | 1.008 |
| Viscosity S. U. at 210° F | 148.0000 | 98.0000 | 460.000 |
| Viscosity-gravity constant | 0.845 | 0.807 | 0.941 |
| Yield volume % | | 70.8 | 28.2 |

From this example it is to be noted that the viscosity-gravity constant of the paraffinic fraction is much less than that of the original oil and less than the mean viscosity-gravity constant of Pennsylvania lubricating oils, and that the viscosity-gravity constant of the naphthenic fraction is considerably greater than that of the original oil and greater than the viscosity-gravity constant of such markedly naphthenic or asphaltic base lubricating oils as oils obtained from the gulf coast and California.

The procedure wherein paraffinic and naphthenic solvents are simultaneously employed and the advantages thereof are more at length set out in my co-pending application, Serial No. 623,483, filed July 20, 1932.

It is intended that distillates and residue, refined or unrefined, may be treated in accordance with this invention, this invention being of special importance in the treating of lubricating oils for the improvement of the characteristics thereof. It is to be understood that this invention is not to be limited by any theory of operation expressed or by any example given and that it includes all modifications and variations falling within the appended claims.

I claim:

1. In the art of refining mineral oil comprising naphthenic and paraffinic constituents, the step comprising extracting the oil, in the presence of an added liquid having greater solvent power for paraffinic constituents of the oil than for naphthenic constituents thereof, with cresylic acid, the said paraffinic solvent and the cresylic acid being adapted to form a two liquid phase solvent system.

2. In the art of refining mineral oil comprising naphthenic and paraffinic constituents, the step comprising extracting the oil, in the presence of an added hydrocarbon solvent therefor having a boiling range substantially below the boiling point of the oil, with cresylic acid comprised principally of cresols, the said hydrocarbon solvent and the cresylic acid being adapted to form a two-layer solvent system.

3. In the art of refining mineral oil comprising naphthenic and paraffinic constituents, the step comprising extracting the oil, in the presence of an added hydrocarbon of the group consisting of ethane, propane, butane, pentane, natural gasoline, low end-point naphtha, and a mixture of two or more thereof, with commercial cresylic acid, said added hydrocarbons and cresylic acid being adapted to form a two-layer solvent system.

4. In the art of refining mineral oil comprising naphthenic and paraffinic constituents, the step comprising extracting the oil in the presence of a liquefied normally gaseous hydrocarbon with cresylic acid consisting principally of cresols and containing relatively small proportions of other ingredients occurring in commercial cresylic acid, the said hydrocarbon and cresylic acid being adapted to form a two-layer solvent system when contacted with each other.

5. In the art of refining mineral oil comprising naphthenic and paraffinic constituents, the step comprising contacting the oil with cresylic acid, and contacting the solution of oil constituents in cresylic acid with a solvent having greater solvent power for paraffinic than for naphthenic constituents of the oil, the said cresylic acid and paraffin solvent being adapted to form a two-layer solvent system when contacted with each other.

6. In the art of refining mineral oil comprising naphthenic and paraffinic constituents, the step comprising contacting the oil with cresylic acid, and contacting the oil not dissolved thereby and the solution thereby formed with a solvent having greater solvent power for paraffinic than for naphthenic constituents of the oil, said cresylic acid and paraffin solvent being adapted to form a two-layer solvent system when contacted with each other.

7. In the art of refining mineral oil comprising naphthenic and paraffinic constituents, the step comprising contacting the oil with cresylic acid, contacting the solution of oil constituents in cresylic acid, with a solvent having greater solvent power for paraffinic than for naphthenic constituents of the oil, and passing the solvent and oil dissolved therein into the first-mentioned contacting step, said cresylic acid and paraffin solvent being adapted to form a two-layer solvent system when contacted with each other.

8. In a process of producing lubricating oil, the steps comprising extracting a residue of mid-continent petroleum with cresylic acid in the presence of a solvent having greater solvent power for paraffinic than for naphthenic constituents of the oil, and separating said solvent and cresylic acid from the resulting fractions, said cresylic acid and paraffin solvent being adapted to form a two-layer solvent system when contacted with each other.

9. In a process of producing lubricating oil, the step comprising extracting the residue of a mid-continent petroleum with cresylic acid in the presence of an added paraffinic solvent to produce fractions of the oil respectively richer in paraffinic and naphthenic constituents of the oil, said cresylic acid and paraffin solvent being adapted to form a two-layer solvent system when contacted with each other.

10. In the art of refining mineral oil comprising naphthenic and paraffinic constituents, the steps comprising contacting the oil with a solvent having greater solvent power for paraffinic than for naphthenic constituents of the oil, and contacting the resulting solution of oil constituents with cresylic acid, said cresylic acid and paraffin solvent being adapted to form a two-layer solvent system when contacted with each other.

11. In the art of refining mineral oil comprising naphthenic and paraffinic constituents, the step comprising contacting the oil with cresylic acid, contacting the solution of oil constituents in cresylic acid with a solvent having greater solvent power for paraffinic than for naphthenic constituents of the oil, separating the solvent and substances in solution therein from the remainder of the solution of oil constituents in cresylic acid, removing the solvent from the substances in solution therein, and returning said substances to the oil passing to the first-mentioned contacting step, said cresylic acid and paraffin solvent being adapted to form a two-layer solvent system when contacted with each other.

12. In the art of refining mineral oil, the step comprising extracting the oil with a mixture of cresylic acid and sulphur dioxide in the presence of a solvent having greater solvent power for paraffinic than for naphthenic constituents of the oil, the said mixture of cresylic acid and sulphur dioxide, when contacted with the said paraffinic solvent, being adapted to form a two-layer solvent system.

13. A process of refining a mineral oil which comprises counterflowing a solvent selective for paraffinic constituents of the oil and cresylic acid, and introducing the oil to the counterflowing solvents at a point intermediate the points where the solvent and cresylic acid are introduced.

14. A process of refining a residual mineral oil which comprises counterflowing a solvent selective for paraffinic constituents of the residual oil and cresylic acid, introducing the oil to the counterflowing solvents at a point intermediate the points where the solvent and cresylic acid are introduced, withdrawing a relatively paraffinic fraction adjacent the point where the cresylic acid is introduced, and withdrawing a relatively naphthenic fraction adjacent the point where fresh solvent is introduced.

15. A process of refining a mineral oil which comprises treating said oil conjointly with a solvent selective for paraffinic constituents of the oil and with cresylic acid having intermingled therewith one of the group of substances consisting of pyridine, aniline or furfural, under conditions adapted to cause the oil and solvents to separate into layers, and separating the layers.

16. In a process of producing lubricating oil, the steps comprising extracting a residue of petroleum with cresylic acid in the presence of a solvent having greater solvent power for paraffinic than for naphthenic constituents of the oil, and separating said solvent and cresylic acid from the resulting fractions, said cresylic acid and solvent being adapted to form a two-layer solvent system when contacted with each other.

17. In a process of producing lubricating oil, the steps comprising extracting a residue of a mineral oil which is more naphthenic than oils from Appalachian fields with cresylic acid in the presence of a solvent having greater solvent power for paraffinic than for naphthenic constituents of the oil, and separating said solvent and cresylic acid from the resulting fractions, said cresylic acid and other solvent being adapted to form a two-layer solvent system when contacted with each other.

18. The process as claimed in claim 1 wherein the added liquid consists mainly of hydrocarbons having less than five carbon atoms and a vapor pressure markedly higher than gasoline.

19. The process as claimed in claim 1, wherein the solvent and cresylic acid are employed in amounts in the order of double the weight of the oil.

20. In the art of refining mineral oil by means of a paraffinic solvent and a naphthenic solvent, the steps comprising separating a naphtheic extract from the oil, separating a portion of the extract from the balance thereof by means of paraffinic solvent, removing paraffinic solvent from said portion, adding naphthenic solvent to the resulting portion of said extract to cause a separation of the resulting mixture into layers, and separating the layers.

21. In the art of refining mineral oil, the steps comprising treating the oil with a solvent composed primarily of cresols, in the presence of an added liquid having greater solvent power for paraffinic constituents of the oil than for constituents soluble in the cresols, separating the mixture into layers, and separating the layers.

22. The process of refining mineral oil which comprises treating it conjointly with a relatively light hydrocarbon solvent and with another solvent composed primarily of cresols, permitting the mixture to separate into layers, separating the layers, and recovering the solvents.

23. In the art of refining mineral oil comprising naphthenic and paraffinic constituents, the steps comprising contacting the oil to be treated with a naphthenic solvent heavier than the oil to be treated, separating from the mixture thus produced naphthenic solvent containing oil constituents in solution, contacting the separated naphthenic solvent and oil constituents with a paraffinic solvent, separating from the mixture thus produced paraffinic solvent containing oil constituents in solution, removing the paraffinic solvent from the mixture separated in the last preceding step, and returning the resulting oil constituents to contact with the oil and naphthenic solvent in the first recited step, said naphthenic solvent and paraffinic solvent being adapted to form a two-layer solvent system when contacted with each other.

24. In the art of refining residual mineral oil containing naphthenic and paraffinic constituents, the steps comprising first contacting the oil to be treated with naphthenic solvent heavier than the oil to be treated, separating naphthenic solvent containing oil constituents dissolved therein from the mixture thus produced, contacting the separated naphthenic solvent containing oil constituents with liquefied propane employed as a paraffinic solvent, separating propane and oil constituents in solution therein from the remainder of the mixture produced in the last preceding step, vaporizing propane from the thus separated propane solution, and returning the constituents from which propane has been vaporized to the first mentioned contacting step, said naphthenic solvent and propane being adapted to form a two-layer solvent system when contacted with each other.

MALCOLM H. TUTTLE.